United States Patent
Ju et al.

[11] Patent Number: 5,925,837
[45] Date of Patent: Jul. 20, 1999

[54] MANUFACTURING METHOD AND PRODUCTS OF METALLIC FRICTION MATERIAL

[75] Inventors: Chien-Ping Ju; Jiin-Huey Chen Lin, both of No. 1, Ta Hsueh Road, Tainan; Sun-Zen Chen, Yi Lan Hsien, all of Taiwan

[73] Assignees: Chien-Ping Ju; Jiin-Huey Chen Lin, both of Tainan, Taiwan

[21] Appl. No.: 09/153,936

[22] Filed: Sep. 16, 1998

[51] Int. Cl.$^6$ .................................. B22F 3/16; B22F 3/24
[52] U.S. Cl. .................................. 75/247; 75/243; 75/232; 419/19; 419/26; 419/54; 419/45; 419/38
[58] Field of Search ............................. 75/243, 232, 247; 419/19, 26, 45, 54, 38

[56] References Cited

U.S. PATENT DOCUMENTS

| | | | |
|---|---|---|---|
| 4,871,394 | 10/1989 | Baker et al. | 75/232 |
| 5,125,962 | 6/1992 | Krentscher | 75/247 |
| 5,324,592 | 6/1994 | Blankenhagen et al. | 428/552 |
| 5,824,923 | 10/1998 | Kondoh et al. | 75/247 |
| 5,841,042 | 11/1998 | Kato | 75/231 |

*Primary Examiner*—Daniel J. Jenkins
*Attorney, Agent, or Firm*—Pro-Techtor International Services

[57] ABSTRACT

A manufacturing method and products of metallic friction materials includes processes of 1. preparing powder materials, 2. mixing copper as a base, proper proportion of iron powder or steel wool, aluminum powder, zinc or tin or lead powder, graphite powder and alumina or silicon dioxide powder, 3. pressing mixed materials into green bodies under 375~625 MPa at room temperature, 4. pre-heat treating the green bodies in an air furnace with temperature raised to 100~300° C. for 1~3 hours, 5. sintering the green bodies into test samples under 350~750 MPa for 24~60 hours to gain sintered friction materials having an oxidized layer of less than 1 mm thick, 6. processing and grinding the sintered test samples with grinders to remove the oxidized layer, 7. washing the outer surface of the sintered test samples ground into finished products. The method of the invention may reduce largely difficulty in manufacturing processes, the investment and productive cost. Products according to the invention has friction coefficient within the standard value, low wear loss and good heat stability.

6 Claims, 5 Drawing Sheets

MANUFACTURING METHOD AND PRODUCTS OF METALLIC FRICTION MATERIAL

BACKGROUND OF THE INVENTION

This invention relates to a manufacturing method and products of metallic friction materials, particularly to one reducing largely difficulty in manufacturing processes, needing low investment and productive cost.

Friction material is generally meant to such one used for moving or stopping a mechanical component, such as a clutch or a brake lining, etc. Early friction material included commonly asbestos, which has been found harmful to the environment and humane health, and gradually prohibited its use and replaced with other friction materials such as non-asbestos organic friction materials, semi-metallic, metallic friction materials. In a recent decade powder metallurgy has been developed greatly, and not a few commercialized products have been offered in market, utilizing technology of powder metallurgy. The present invention, metallic friction materials, is produced by utilizing powder metallurgy.

At present, many commercial friction materials (such as clutches, brake linings, etc.) are based on semi-metallic and metallic materials, the latter using technique of powder metallurgy, which includes: 1. preparing materials, 2. a process of making green bodies, 3. a process of proper heat treatment, and 4. micro-machining. The process of making green bodies is generally conducted at room temperature. The process of heat treatment is not merely to choose a proper temperature for sintering, the time needed, speed of raising temperature, etc., but also to control atmosphere during heat treating as an important point.

As for metallic friction materials, copper or iron alloys are mostly used, as disclosed in U.S. Pat. Nos. : 3,981,398, 4,311,524, 4,391,641, 4,415,363, 5,370,725 using iron-base friction materials.

The U.S. Pat. No. 3,891,398 uses an alloy made of nickel, copper, coke, graphite, silicon dioxide and alumina then formed under pressure of 200~300 MPa, then treated in 1000° C. under reducing atmosphere for 15 minutes ~3 hours, then cooled, finally densified under less than 800 MPa.

The U.S. Pat. No. 4,311,524 uses copper, tin, zinc sulphide, pyroceramic, graphite and lead etc. mixed in iron powder, formed by pressure under 294 MPa, then sintered at 1030° C. for three hours under protected atmosphere of 1.96 MPa.

The U.S. Pat. No. 4,415,363 uses mainly iron, mixed with graphite, coke, tin, mullite, kyanite, silicon dioxide, steel wool and copper, formed under pressure coolly into green bodies under 411.6 MPa, treated at 700~1100° C. under protected atmosphere for 30 minutes, then cooled and densified under 11.6 MPa.

The U.S. Pat. No. 5,370,725 produces iron synchronizer rings including: iron, carbon, copper, chromium, manganese, barium and phosphorus, formed into green bodies under 588 MPa, sintered at 1000~2000° C. under controlled protected atmosphere for 80 minutes.

Further, U.S. Pat. Nos.: 4,050,620, 4,278,153, 4,394,275, 4,576,872, 4,871,394, 5,105,513, 5,125,962, 5,501,833 and 5,518,519 disclose copper-base abrasive materials.

U.S. Pat. No. 4,576,872 uses copper, tin, alumina, mica, graphite, lead, silicon dioxide, iron, nickel, chromium, titanium dioxide and steel fiber pressed to form green bodies under 482.23 MPa, and then sintered for 1 hour at 750° C. under 0.15 MPa and protected atmosphere of 90% nitrogen and 10% hydrogen.

U.S. Pat. No. 4,871,394 uses copper powder mixed with silicon dioxide (or alumina), graphite, lead, tin and zinc, pressed to form green bodies of density 2.9~3.1 g/cm$^3$, with a core plate pinched by two green bodies, and sintered for 1 hour at 650° C. under 0.52 MPa protected in non-oxidizing atmosphere.

U.S. Pat. Nos. 5,501,833 and 5,518,519 use hard particles and copper-tin alloy ground into mixed powder, pressed to form green bodies under 392~588 MPa, sintered for 1 hour under nitrogen atmosphere, and then reshaped into annular friction material.

In the academic field, manufacturing friction material test samples and study about impact of wear characteristics of different ingredients and friction modes is always one of the important issues for discussion. Jamil made a systematic analysis and discussion in regard to friction materials of the copper system containing iron of 10% by wt., pressed to form green bodies under different pressures and sintered for 1 hour at 1140° C. under protective atmosphere of $5H_2$—$N_2$.

Danninger discussed about the mechanical change of friction materials with vacancies (which produced in sintering process). The ingredients is made by the copper system containing iron of 3% by wt., having different particle sizes, pressed to form green bodies under 1200 MPa and 600 MPa, and then sintered for 2 hours at 1120° C. and 1250° C. under the protective atmosphere of hydrogen.

It is evident that the manufacture of copper-base or iron-base friction materials according to powder metallurgy has a process of sintering them in vacuum or under controlled protective atmosphere, whether disclosed in the patent field or the academic treatises. The manufacturing processes used in them have the following disadvantages, reducing their commercial value to a large extent.

1. A high temperature vacuum or controlled atmosphere furnace is necessary, resulting in an extremely high investment cost.

2. Sintering needs a temperature as high as 800–1200° C., under a proper protective atmosphere (preventing oxidization), evidently increasing difficulty in manufacture.

3. Sintering powder materials in high temperature vacuum or atmosphere-controlled furnace slows the speed of production, and requires much electricity, resulting in high cost.

SUMMARY OF THE INVENTION

A purpose of the invention is to offer a manufacturing method and products of metallic friction materials reducing largely in difficulty in manufacturing processes, needing low investment and productive cost, but having high commercial value.

Another purpose of the invention is to offer products of metallic friction materials low in wear loss, but high in temperature stability, and good practicality.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
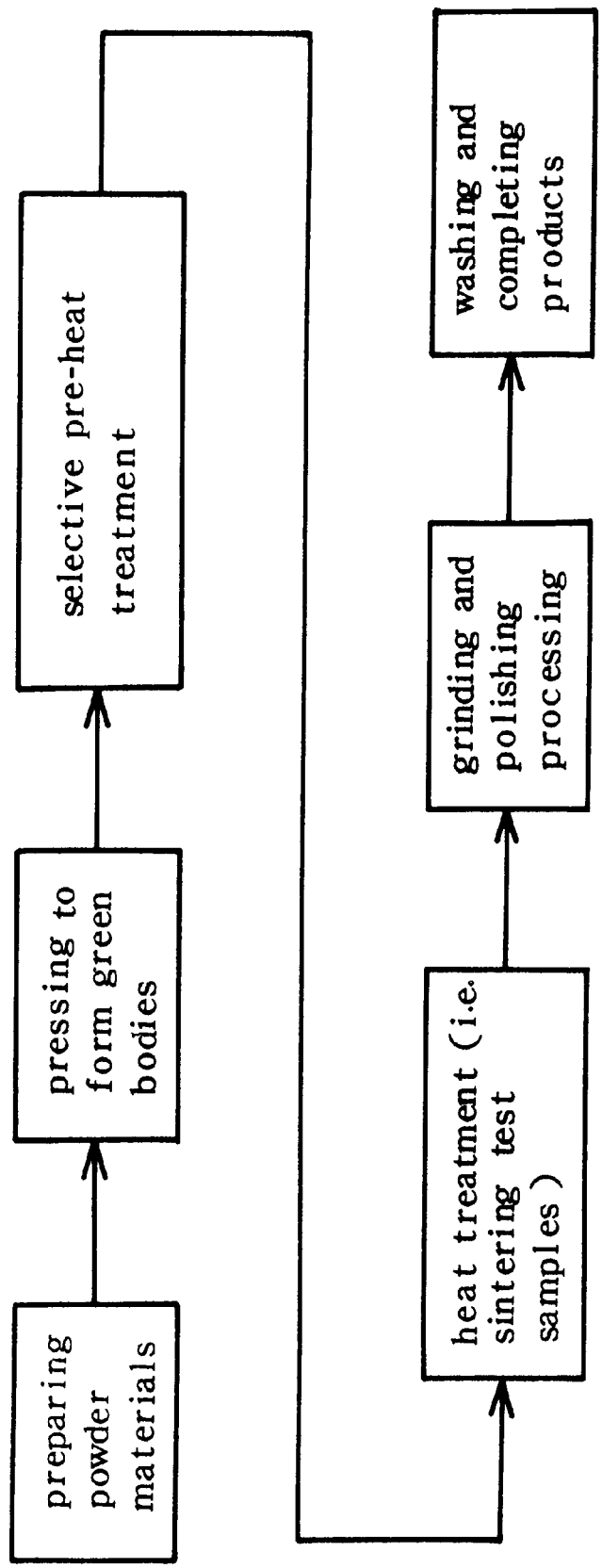
FIG. 1 is a block diagram of a manufacturing method of metallic friction materials in the present invention..

A preferred embodiment of a manufacturing method for friction materials in the present invention, as shown in FIG. 1, includes processes of 1. preparing powder materials, 2. pressing to form green bodies, 3. selective pre-heat treatment, 4. heat treatment in the atmospheric environment (i.e. sintering test samples in a commonly-used air furnace), 5. grinding and polishing processing, 6. washing and completing products.

1. Preparing powder materials begins with copper as a base, mixed with iron powder or steel wool of 10%~40% by wt., aluminum powder of 0%~10% by wt., zinc or tin or lead powder of 0%~15% by wt., graphite powder of 3%~15% by wt., and alumina or silicon dioxide powder of 0%~10% wt..

2. After the material powders are prepared, they are pressed to form green bodies under 375~625 MPa at room temperature of 20~30° C.

3. The green bodies are pre-heated selectively to 100~300° C. in an air furnace for 1~3 hours, but 250° C. for 2 hours constantly is preferable.

4. After pre-heat treatment, the green bodies are sintered at 350~750° C. under the air atmosphere for 24~60 hours, becoming friction materials having an oxidized layer of less than 1 mm thick. Heat treatment at 630° C. for 48 hours is preferable.

5. Semi-products are ground with a mechanical machine for removing the oxidizing layer to make the outer surface flat and smooth.

6. Washing those products finished with grinding and with powder or dirt removed off the outer surface of each product, acquiring finished products.

As understood from the above description, all the processes of the invention are carried out in the normal atmosphere, needing no environment of vacuum condition or controlled protected atmosphere, but only requiring a normal and low temperature air furnace for sintering copper-base metallic friction materials under air atmosphere.

Data about the metallic friction materials acquired from the present invention after tested according to the standard wear tests are shown in the graphs in FIGS. 2, 3, 4 and 5.

Figure 2:
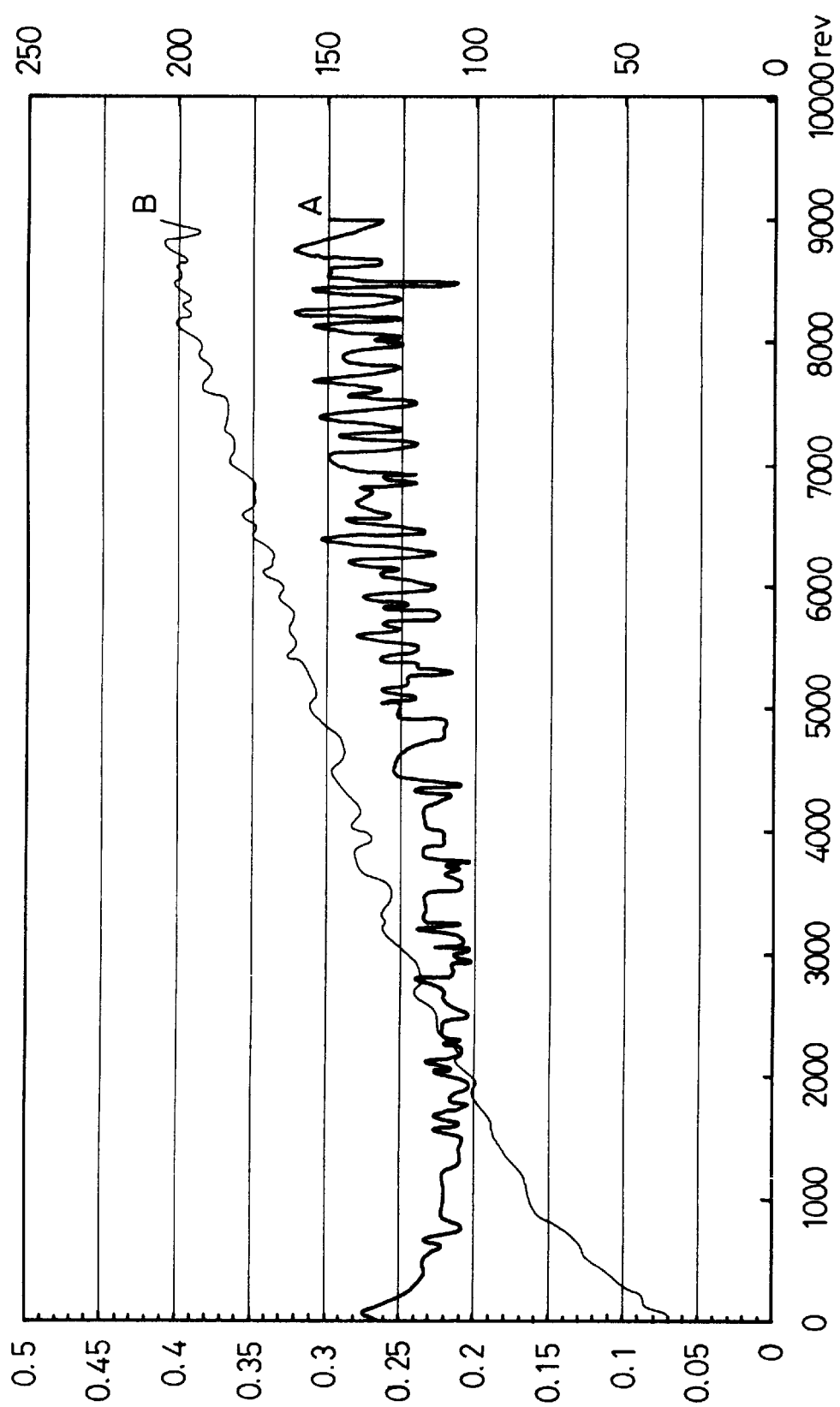
FIG. 2 is a graph of the friction feature of products according to the present invention.

The graph shown in FIG. 2 shows the change of the friction coefficient of friction materials under the equivalent speed of 9000 rev. and under 500 rpm and 1 MPa. It is evident that the friction coefficient of the test samples gradually rises up after the equivalent speed of 3000 rev., maintained between 0.2 and 0.3, which is the proof of the stable friction coefficient of the test samples. The curve A represents friction coefficient of the test samples of the present invention and the curve B is the temperature, with the left side of the Figure being friction value, with the right side thereof being temperature, with the lower side thereof being revolution.

Figure 3:
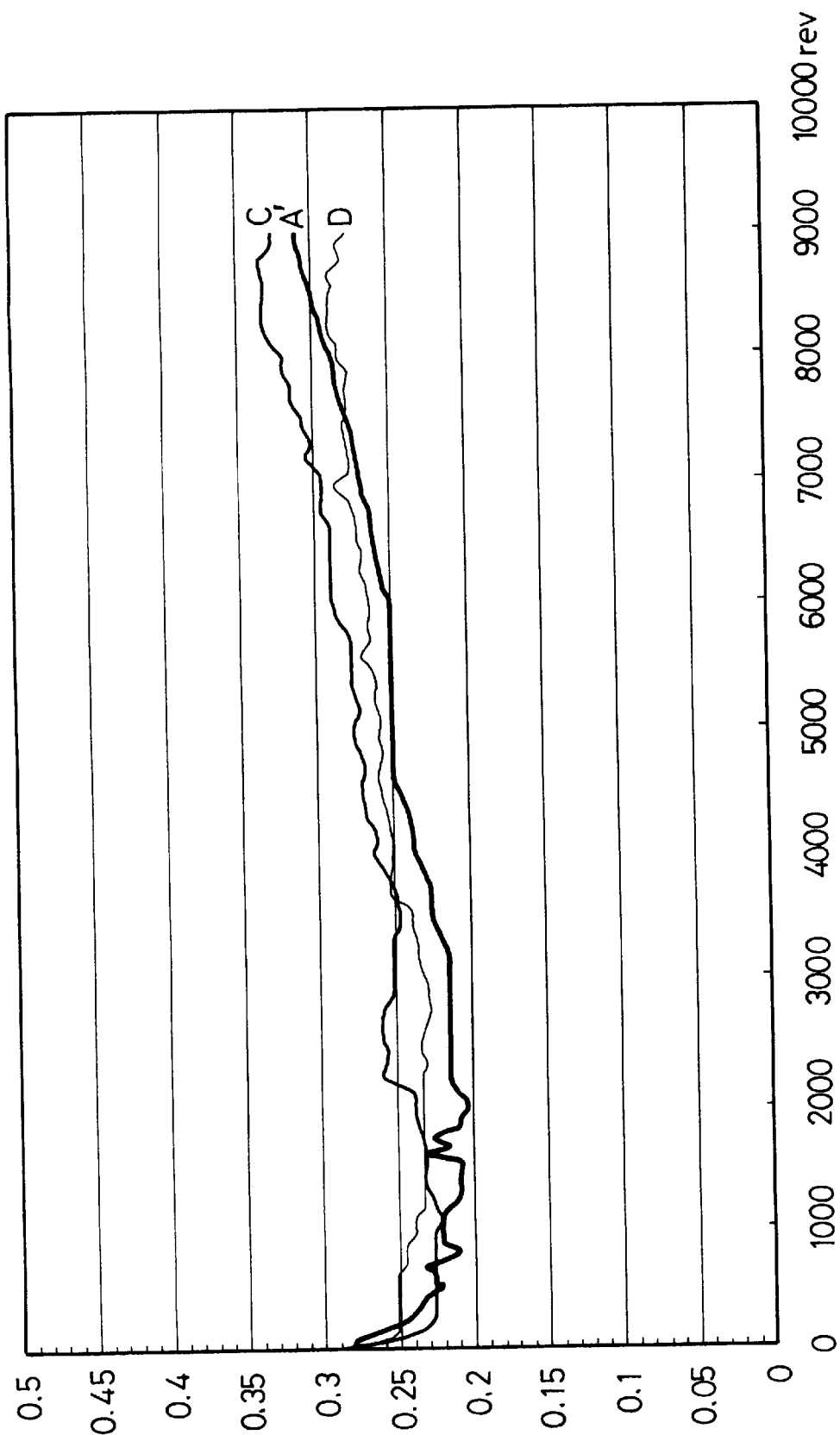
FIG. 3 is a graph of comparing friction coefficients of two motorbike brake linings made by the commercial methods and that made by the present invention.

FIG. 3 shows the compared average friction coefficient of a commercial motorbike disk brake linings and a friction material test sample of the present invention, under the same condition just described above, i.e. 500 rpm and 1 MPa. The densest curve A' represents the test sample of the present invention, the denser curve C and the slender curve D respectively represent the commercial disk-shaped brake linings. The left side of the Figure is friction coefficient, the lower side being revolution. It is evident that the average friction coefficient of the three test samples are almost the same, maintained between 0.2 and 0.3. And before 7500 rev. that of the test sample A' of the present invention is a little less than that of the two commercial ones C and D. But when the sliding distance reaches 8000 rev. that of the two commercial ones tend to decline, but that of the test sample A' of the present invention still holds high stability.

Figure 4:
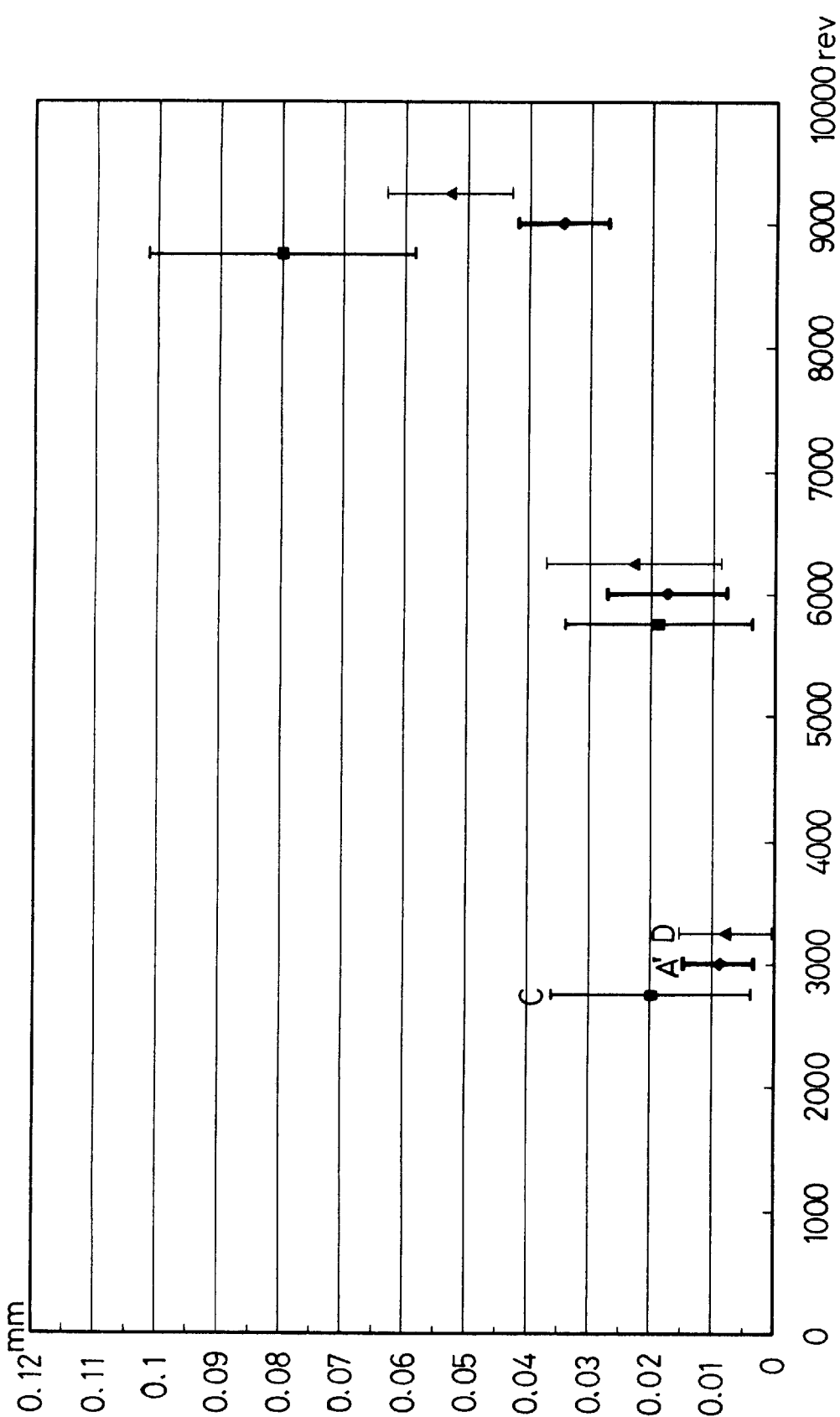
FIG. 4 is a graph of comparing wear loss of the motorbike brake linings made by the commercial methods and that made by the present invention.

FIG. 4 shows thickness loss of the three test samples after running 3000, 6000, 9000 rev. After 3000 rev. test, the three A', C and D have almost the same average thickness loss. But after 6000 rev. test, the thickness losses of the two commercial ones C and D distinctly surpass that of the test sample A' of the present invention. Once the sliding distance reaches 9000 rev., the thickness loss of the commercial one D reaches 1.5 times that of the invention sample A', and the other commercial one C has a thickness loss more than 2 times that of the invention sample A'. Further, the commercial ones C and D show more uneven wear than the invention sample A' does. For example, the commercial one C has higher difference of the standard deviation than that of the invention sample A', as large as 293% after test of 9000 rev. of constant speed. This means that the two commercial brake linings C and D have worse heat (temperature) stability than the invention sample A'. So the commercial ones C and D have comparatively large wear, with the difference standard deviation of the thickness loss being also comparatively large.

Figure 5:
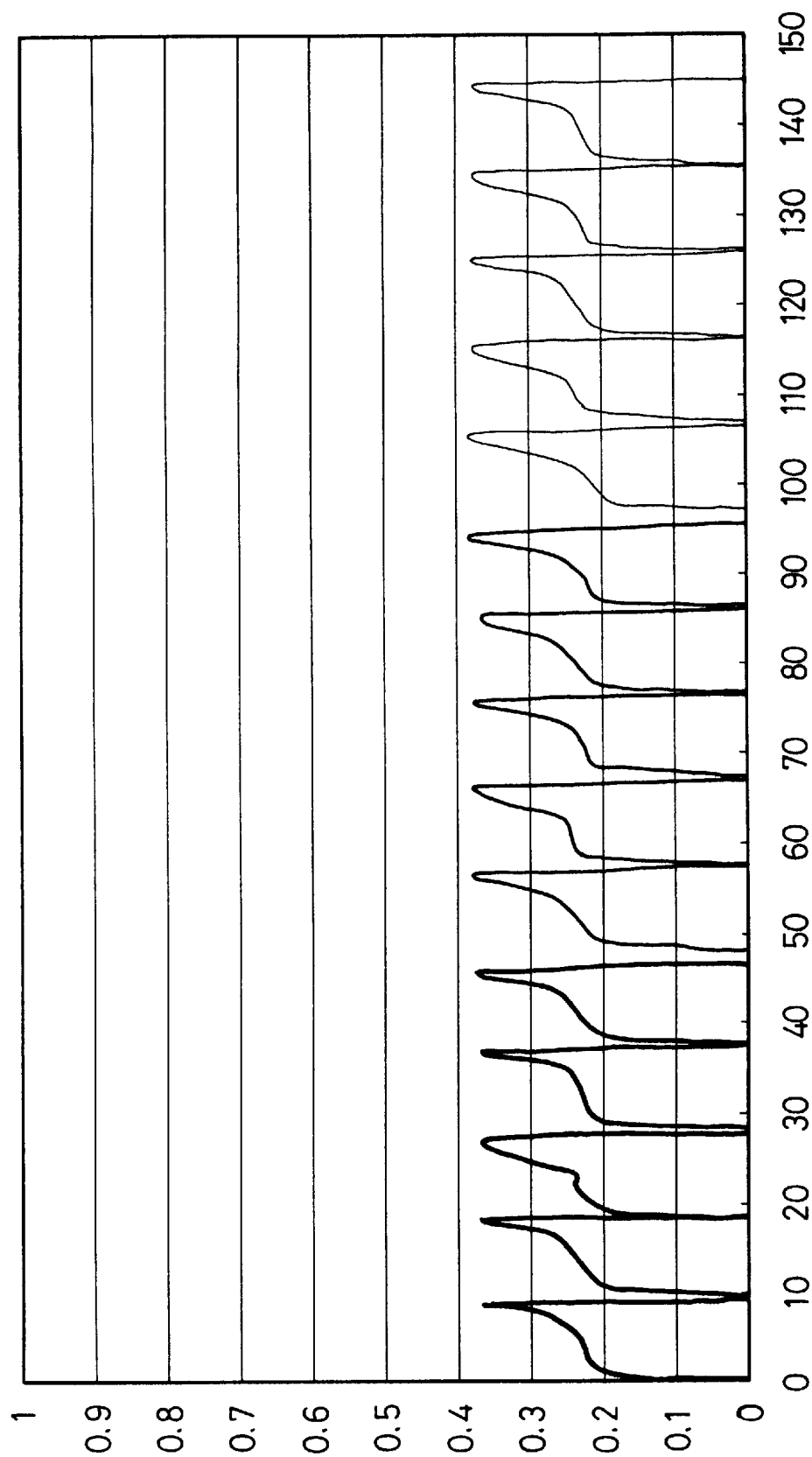
FIG. 5 is a graph of brake simulation tests in the present invention.

FIG. 5 shows the abridged change in friction characteristics of the invention sample A' receiving 100 tests of simulation braking, with each braking time being 9 seconds or so. The moment of inertia for the simulation braking is supplied by 8 fly wheels of 250 kg and 0.2 m in radius. The revolution velocity is 1000 rpm, the pressure being 1 MPa, with the left side of the Figure being friction coefficient, the lower side thereof being time (second). It can be understood from the Figure that in the whole process of braking the friction coefficient at the contact instant is as low as 0.2, and then the friction coefficient gradually rises up as the contact of the brake lining continues to reach about 0.36 when the braking action stops. This kind of friction characteristics of low friction coefficient at the contact instant and gradual rise afterward gives comparative comfortable feeling when braking is carried out. Further, it can be understood from the FIG. 5 that the invention sample A' has always extremely high stability of friction coefficient in the process of simulation braking of 100 times. The densest curves show the 1st to the 5th simulation braking, the denser curves the 48th to the 52th, and the slender curves the 96th to the 100th.

It may be understood from the data of the tests that friction materials of the present invention have very high thermal and tribological stability. Further, the present invention proves that friction materials may be manufactured by sintering in the air atmosphere and the manufacturing method may reduce largely the investment and productive cost compared to the conventional power metallurgy method using a high temperature vacuum/inert furnace under a protective atmosphere, and at the same time the product of the present invention has better friction coefficient and wear characteristics than the commercial product.

The manufacturing method and products of metallic friction materials in the present invention has the following advantages:

1. In the manufacturing processes, material is heat-treated in the air atmosphere and at a comparatively low temperature, needing no vacuum or protected atmosphere condition, and reducing difficulty in the processes.
2. Only an air furnace is required for its equipment, largely reducing the investment and productive cost, but high investment and high productive cost is needed in the conventional method requiring high temperature vacuum or controlled protected atmosphere.
3. Friction coefficient of the products is very stable and satisfies the standard test.
4. Wear loss (i.e. wear thickness) of the products is comparatively low.
5. Heat (temperature) stability of the products is comparatively good.

While the preferred embodiment of the invention has been described above, it will be recognized and understood that various modifications may be made therein and the appended claims is intended to cover all such modifications which may fall within the spirit and scope of the invention.

We claim:

1. A manufacturing method for metallic friction materials comprising processes of:
   (1) preparing powder materials, using copper as a base, mixed with proper proportion of iron powder, iron powder or steel wool, aluminum powder, zinc or tin or lead powder, graphite powder, and alumina or silicon dioxide;
   (2) pressing said powder materials to form green bodies under 375~625 MPa at room temperature;
   (3) selectable pre-heat treatment, heating in an air furnace said green bodies with temperature raised to 100~300° C. for 1~3 hours;
   (4) sintering test samples after said pre-heat treatment, sintered at 350~750° C. under air atmosphere for 24~60 hours, and making sintered friction materials having an oxidized layer of less than 1 mm thick;
   (5) processing and grinding with grinders for removing said oxidized layer;
   (6) washing the products finishing the grinding process to clean the outer surface of each product which becomes a finished product; and,
   characterized by said manufacturing processes reducing largely difficulty in operation, and lowering at the same time the investment and productive cost largely.

2. The manufacturing method for metallic friction materials as claimed in claim 1, wherein said iron powder or steel wool occupies the weight proportion of 10%~40%, said aluminum powder 0%~10%, said zinc or tin or lead powder 0%~15%, said graphite powder 3%~15%, and alumina powder or silicon dioxide powder 0%~10%.

3. The manufacturing method for metallic friction materials as claimed in claim 1, wherein said pre-heat treatment is preferably performed with 250° C. at constant temperature for 2 hours.

4. The manufacturing method for metallic friction materials as claimed in claim 1, wherein said sintering test samples are preferably treated at 630° C. or so for about 48 hours.

5. A metallic friction materials comprising copper as a base, and proper proportion of iron powder or steel wool, aluminum powder, zinc or tin or lead powder, graphite powder, and alumina powder or silicon dioxde powder mixed in said copper powder, said mixed powder materials pressed to form green bodies, then said green bodies receiving pre-heat treatment and then sintered in an air furnace into test samples with an oxidized layer, then processed and ground to remove an oxidized layer and then washed to become finished products, and characterized by said metallic friction materials made with difficulty largely reduced in their manufacturing processes, the investment and the productive cost, said metallic friction materials having sufficient friction coefficient, low wear loss and good thermal stability.

6. The metallic friction materials as claimed in claim 5, wherein the weight proportion of said iron powder or steel wool occupies 10%~40%, aluminum powder 1%~10%, zinc powder or tin powder or lead powder 0%~10%, graphite powder 3%~15%, and alumina powder or silicon dioxide powder 0%~10%.

* * * * *

UNITED STATES PATENT AND TRADEMARK OFFICE
CERTIFICATE OF CORRECTION

PATENT NO.  : 5,925,837
DATED       : Jul. 20, 1999
INVENTOR(S) : Chien-Ping JU et al.

It is certified that error appears in the above-identified patent and that said Letters Patent is hereby corrected as shown below:

On the title page, item 75, please delete "Jiin-Huey Chen Lin", and insert --Jiin-Huey Chern Lin--.

Signed and Sealed this

Eleventh Day of April, 2000

Q. TODD DICKINSON

Attest:

Attesting Officer

Director of Patents and Trademarks

UNITED STATES PATENT AND TRADEMARK OFFICE
CERTIFICATE OF CORRECTION

PATENT NO. : 5,925,837
DATED : July 20, 1999
INVENTOR(S) : Chien-Ping Ju et al.

It is certified that error appears in the above-identified patent and that said Letters Patent is hereby corrected as shown below:

<u>Title page,</u>
Item [73], please delete, "Jiin-Huey Chen Lin", and insert -- Jiin-Huey Chern Lin --.

Signed and Sealed this

Twenty-fifth Day of March, 2003

JAMES E. ROGAN
*Director of the United States Patent and Trademark Office*